United States Patent [19]
Takeuchi

[11] Patent Number: 5,352,009
[45] Date of Patent: Oct. 4, 1994

[54] DOOR SEAL DEVICE

[75] Inventor: Norio Takeuchi, Hiroshima, Japan

[73] Assignee: Nishikawa Rubber Co., Ltd., Hiroshima, Japan

[21] Appl. No.: 35,451

[22] Filed: Mar. 23, 1993

[30] Foreign Application Priority Data

Mar. 30, 1992 [JP] Japan .................. 4-105774

[51] Int. Cl.$^5$ .............................. B60J 10/08
[52] U.S. Cl. .................. 296/146.9; 49/490.1
[58] Field of Search ............. 296/146.9, 202; 49/490.1

[56] References Cited

U.S. PATENT DOCUMENTS

| | | | |
|---|---|---|---|
| 3,195,948 | 7/1965 | Sturtevant et al. | 296/146.9 X |
| 4,769,950 | 9/1988 | Ogawa et al. | 49/490.1 |
| 4,976,069 | 12/1990 | Arima et al. | 49/490.1 |

FOREIGN PATENT DOCUMENTS

| | | | |
|---|---|---|---|
| 3148255 | 6/1983 | Fed. Rep. of Germany | 296/146.9 |
| 2200519 | 8/1990 | Japan | 296/146.9 |

Primary Examiner—Dennis H. Pedder
Attorney, Agent, or Firm—Flynn, Thiel, Boutell & tanis

[57] ABSTRACT

A door seal device capable of enlarging the degree of opening of the door at the time of getting on or off the car and of allowing the outer appearance of the bottom surfaces of the door seal device and the door frame to look nice when viewed from the room side. A door seal device which elastically contacts a convex portion of a door frame of a car at the room side comprises a U-shaped door seal device carrier which has a core embedded therein and a hollow seal portion and is integrated with the U-shaped door seal device carrier wherein the seal device carrier elastically contacts the convex portion of the door frame and engages with a body flange protruding from a body opening edge, characterized in that the core is bent at the angle of at least 100 degrees relative to the outdoor side so that the bottom surface of the door seal device is substantially flush with the bottom surface of the door frame at the state where the U-shaped door seal device carrier engages with the body flange.

5 Claims, 2 Drawing Sheets

DOOR SEAL DEVICE

BACKGROUND OF THE INVENTION

1. Field of the Invention

The present invention relates to a door seal device for elastically contacting a convex portion of a door frame of a car at an interior side thereof.

2. Prior Art

A conventional door seal device will be described with reference to FIGS. 1 and 2. Denoted at 18 is an interior, or passenger compartment of a car and 19 is an exterior of the car. A door seal device 90 comprises a U-shaped door seal device carrier 91 having a core 93 inside thereof and a hollow seal portion 92 at the exterior side 19 wherein the hollow seal portion 92 is integrated with the U-shaped door seal device carrier 91 and the U-shaped door seal device carrier 91 engages a body flange 22 which protrudes from a body opening edge 21.

In the conventional door seal device 90, since the core 93 is bent at the angle of X, which is 90 degrees, the bottom surface 94 of the door seal device 90 protrudes downward so that it is lower than the bottom surface 12 of a door frame 10 by the height Y. Accordingly, there are such problems that the degree of opening of the door is narrowed at the time of getting in or out of the car and the outer appearance of the bottom surfaces of the door seal device 90 and the door frame 10 looks poor when viewed from the interior 18.

SUMMARY OF THE INVENTION

It is therefore an object of the present invention to provide a door seal device capable of enlarging the degree of opening of the door and of allowing the appearance of the bottom surfaces of the door seal device 90 and the door frame 10 to look nice when viewed from the interior 18.

A door seal device 30 which elastically contacts a convex portion 11 of a door frame 10 of a car at the interior 18 comprises a U-shaped door seal device carrier 31 which has a core 33 embedded therein and a hollow seal portion 32 integrated with the U-shaped door seal device carrier 31 wherein the seal device carrier 31 elastically contacts the convex portion 11 of the door frame 10 and engages with a body flange 22 protruding from a body opening edge 21, characterized in that the core 33 is bent at the angle Z of at least 100 degrees relative to the exterior side 19 so that the bottom surface 34 of the door seal device 30 is substantially flush with the bottom surface of the door frame 10 at the state where the U-shaped door seal device carrier 31 engages with the body flange 22.

PREFERRED EMBODIMENT OF THE INVENTION

Figure 1:
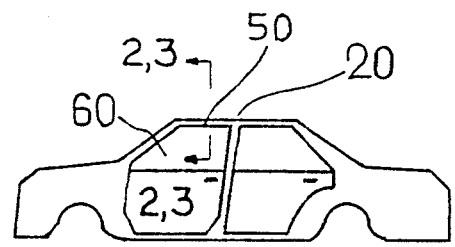
FIG. 1 is a side view of a car.
Figure 2:
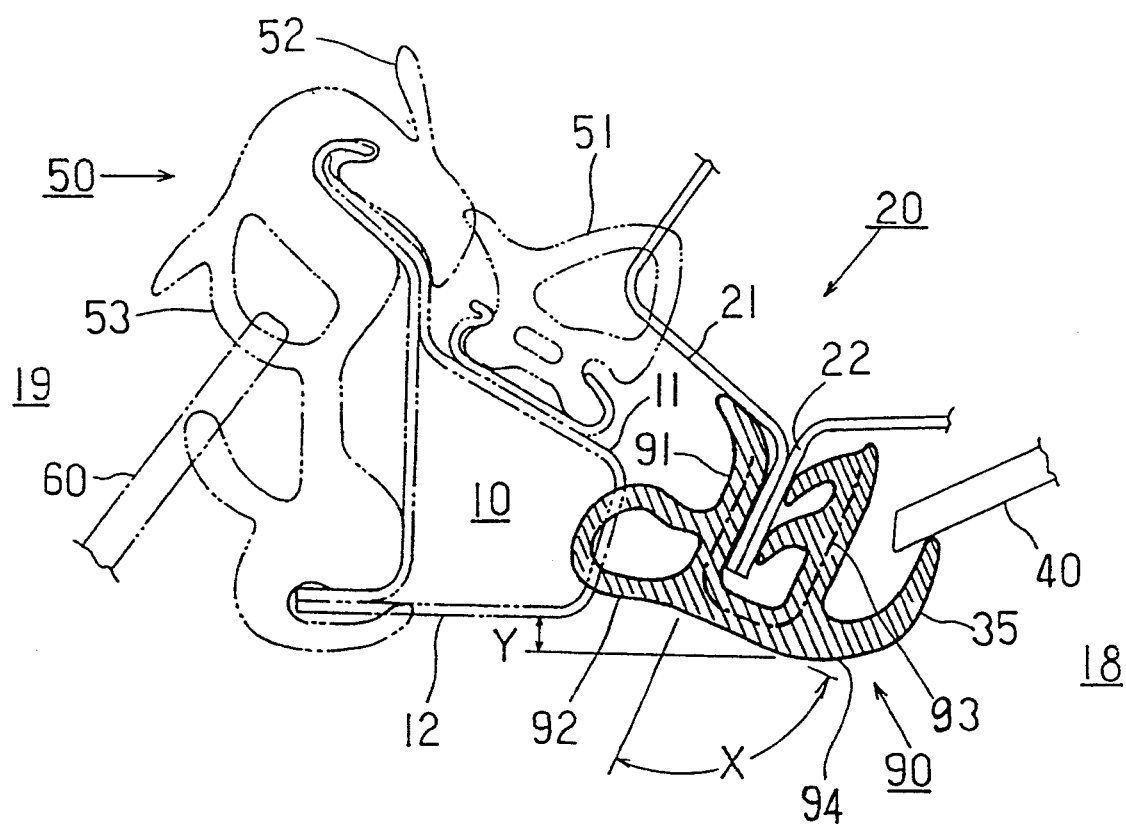
FIG. 2 is a cross-sectional view taken along the line 2—2 of the car in FIG. 1 having a conventional door seal device.
Figure 3:
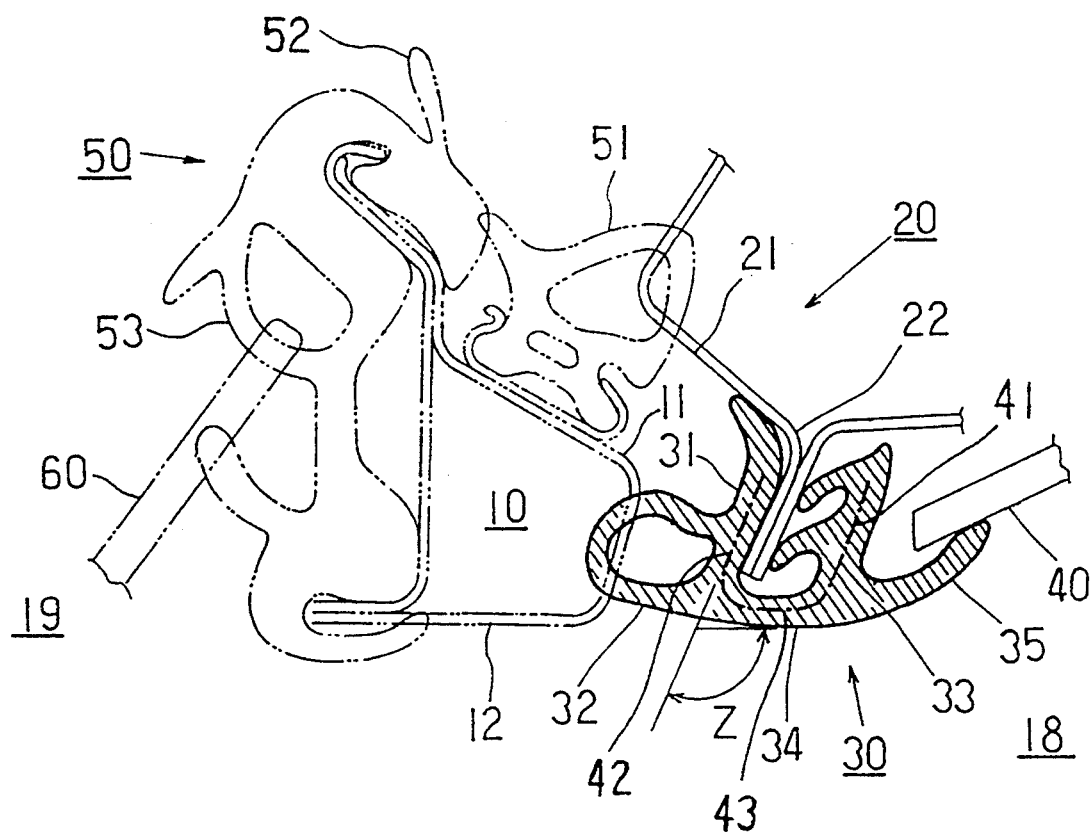
FIG. 3 is a similar cross-sectional view taken along the line 2—A of the car in FIG. 1 but having a door seal device according to the present invention.

A door seal device according to the present invention will be described with reference to FIG. 3.

A U-shaped door seal device carrier 31 or retainer 31 frictionally engages with a body flange 22 of a body opening edge 21 of a car body 20. A hollow seal portion 32 is integrated with the door seal device carrier 31 at an exterior side 19. A core 33 is embedded in the door seal device carrier 31 for enhancing the engagement of the door seal device carrier 31 with the body flange 22. The core 33 is bent at an obtuse angle Z in FIG. 3 which is at least 100 degrees, preferably in the range of about 100 to 110 degrees relative to the exterior side 19, and it is bent at an acute angle, i.e. less than 80 degrees relative to the interior 18 whereby a lowermost portion of a continuous bottom surface 34 of the door seal device 30 is flush with the bottom surface 12 of a door frame 10 at the state where the door seal device carrier 31 engages with the body flange 22. A lip seal 35 protrudes from the tip end of the door seal device carrier 31 toward the interior 18 and elastically contacts the outer surface of a ceiling panel 40 at the interior 18. Another door seal device 50 is attached to the door frame 10 and comprises a main seal 51 which elastically contacts the body opening edge 21, a subsidiary seal 52 and a glass run 53 which elastically contacts a window glass 60.

With the arrangement of the door seal device 30, the bottom surface 34 of the door seal device 30 is substantially flush with the bottom surface 12 of the door frame 10 so that the degree of opening of the door is enlarged and the outer appearance of the bottom surfaces of the door seal device 30 and the door frame 10 looks nice when viewed from the interior 18.

Accordingly, the door seal device of the present invention permits a driver and/or passenger to more easily enter and exit the car and also makes the door seal device in more practical use such as the outer appearance of the door looks nice when viewed from the interior compared with the conventional door seal device, particularly in view of such a latest tendency that the height of the car is reduced and the seal member is multiplied (cut line seal, main seal, opening seal, etc.), which results in the difficulty of ensuring the degree of opening of the door.

What is claimed is:

1. A weather strip for sealing a gap between an opening edge of a car body and a frame of a car door, the device comprising:

an upwardly opening U-shaped retainer portion frictionally engaged with a flange protruding downwardly from the opening edge;

a hollow seal portion integrally secured to an exterior side of said retainer portion and elastically contacting an interior side of the frame when the car door is closed; and said retainer portion and said hollow seal portion cooperating to define a continuous bottom surface oriented in a plane extending substantially parallel with a lower surface of the frame, an outer leg of said retainer portion extending at an acute angle of no more than 80° with respect to said plane, and a lowermost portion of said bottom surface being substantially flush with the lower surface of the frame.

2. The device claimed in claim 1, wherein said retainer portion includes a core embedded therein.

3. The device claimed in claim 1, further including a lip seal portion integrally secured to an interior side of said retainer portion and having an inwardly extending free end which elastically contacts a ceiling panel within a passenger compartment of the car body.

4. The device claimed in claim 3, wherein said lip seal portion further defines said bottom surface.

5. An automobile weather strip comprising:

an upwardly opening substantially U-shaped retainer portion frictionally engaged with a flange protruding downwardly from an opening edge of a car body, said retainer portion having a substantially U-shaped core imbedded therein, the core including two spaced-apart parallel leg portions and a central portion connecting said leg portions together at mutual ends thereof;

a hollow seal portion integrally secured to an exterior side of said retainer portion and elastically contacting an interior side of a car door frame when a car door is closed; and said retainer portion and said hallow seal portion cooperating to define a continuous bottom surface oriented in a plane extending substantially parallel with a lower surface of the car door frame and with said central portion, an outer one of said parallel leg portions extending transverse to said plane at an acute angle of no more than 80°, and a lowermost portion of said bottom surface being substantially flush with the lower surface of the car door frame.

* * * * *

UNITED STATES PATENT AND TRADEMARK OFFICE
CERTIFICATE OF CORRECTION

PATENT NO. : 5,352,009
DATED : October 4, 1994
INVENTOR(S) : Norio TAKEUCHI

It is certified that error appears in the above-indentified patent and that said Letters Patent is hereby corrected as shown below:

Column 4, line 3; change "hallow" to ---hollow---.

Signed and Sealed this

Twenty-first Day of February, 1995

Attest:

BRUCE LEHMAN

Attesting Officer     Commissioner of Patents and Trademarks